United States Patent

Verzele

[15] 3,686,316
[45] Aug. 22, 1972

[54] METHOD OF PREPARATION OF EXTRACTS OF HOPS

[72] Inventor: Maurice G. E. Verzele, 13, Krijgslaan, Gent, Belgium

[22] Filed: Jan. 8, 1968

[21] Appl. No.: 696,139

[52] U.S. Cl. ................................260/586 R, 99/50.5
[51] Int. Cl. ..........................C07c 45/00, C12c 9/02
[58] Field of Search ..............99/50.5; 260/666, 586

[56] References Cited

UNITED STATES PATENTS

| | | | |
|---|---|---|---|
| 3,212,854 | 10/1965 | Betts et al. | 99/50.5 X |
| 3,298,835 | 1/1967 | Hildebrand et al. | 99/50.5 |
| 3,364,265 | 1/1968 | Klingel et al. | 260/586 |
| 3,433,642 | 3/1969 | Nakayama et al. | 99/50.5 |

FOREIGN PATENTS OR APPLICATIONS 619,563   5/1961   Canada......................99/50.5

OTHER PUBLICATIONS

Goedkoop et al., " Beer Substances Extractable by Chloroform and Iso-octane," Journal of the Institute of Brewing, Vol. 70, 1964, p. 365.

Standen, A. (ed.), Encyclopedia of Chemical Technology, Interscience Publishers, New York, 1965, p. 675.

Primary Examiner—Joseph M. Golian
Attorney—Sughrue, Rothwell, Mion, Zinn & Macpeak

[57] ABSTRACT

A method of preparation of extracts of hops by means of one or more organic solvent, this method comprising the isomerization of the hop acids and includes isomerizing the $\alpha$-acids of the hops in the presence of a solvent selected from among the group comprising isooctane and methyl cyclohexane.

12 Claims, No Drawings

METHOD OF PREPARATION OF EXTRACTS OF HOPS

The present invention relates to a method of preparation of extracts of hops by means of one or more organic solvent, this method comprising the isomerization of the hop acids in order to transform the α-acids into iso-α acids.

The operation of putting hops in the beer includes processing the wort by the hops at boiling temperature so as to transform the α-acids into iso-α acids, the latter being more soluble and more bitter than the former.

Yield of this reaction in the wort does not exceed 55 percent and, moreover, part of the iso-α acids is eliminated in the course of fermentation and of the operations following the latter, so that the actual yield in the beer is only 25 to 35 percent.

It is known, in order to improve the yield of isomerization, to prepare extracts of hops by means of powerful organic solvents, such as the ketones, the alcohols, the chlorinated hydrocarbons. These extracts are then boiled with the wort, just like the hops.

The yield of isomerization achieved with the help of these methods slightly exceeds that achieved by conventional methods of putting hops in the beer, but the losses are just as substantial.

It is also known to prepare extracts of hops containing already iso-α acids, the latter being obtained by placing the said extracts in the presence of aqueous alkali and by heating the solution prepared in this manner so as to transform the α-acids into iso-α acids.

The known methods to obtain such isomerized extracts are very intricate and call for important and costly installations.

The object of the present invention consists essentially in overcoming this disadvantage by the very judicious selection of an α-acid selective extraction solvent.

For that purpose the method according to the invention includes isomerizing the α-acids of the hops in the presence of a solvent selected from among the group comprising isooctane and methyl cyclohexane.

According to a form of embodiment of the invention, the method includes adding to a solution comprising the said organic solvent and α-acids of hops and alkaline solution, heating the mixture thus obtained in order to transform the α-acids into iso-α acids, acidifying this mixture, separating an organic phase from an aqueous phase of the mixture and submitting the organic phase to evaporation until a syrupy paste containing the iso-α acids is obtained.

According to an advantageous form of embodiment of the invention the method includes adding to a solution comprising the said organic solvent and α-acids of hops an alkaline solution, heating the mixture thus obtained in order to transform the α-acids into iso-α acids, separating the aqueous phase from the organic phase of the mixture and extracting the iso-α acids from the aqueous phase.

According to a particularly advantageous form of embodiment of the invention, the method according to the invention includes bringing the aqueous solution containing the iso-α acids to a pH of 7 magnitude, processing subsequently this solution with a saturated hydrocarbon, separating the aqueous and organic phases achieved, bringing the aqueous phase to a pH of 3 magnitude, extracting the iso-α acid from this aqueous phase by means of a solvent not miscible with water and dissolving the iso-α acid, separating the solvent containing the iso-α acid and lastly collecting the iso-α acid by evaporation of the solvent.

Other details and features of the invention will become apparent from the description given hereinafter, by way of non limitative example, of a method of preparation and purification of extracts of hops according to several forms of embodiment.

In a first form of embodiment of the invention, the method of preparation of extracts of hops includes, in a first stage, carrying out an extraction with hops or not isomerized extracts of hops by means of an α-acids selective solvent. This solvent is advantageously selected from among saturated hydrocarbons having a boiling point close to 100° C. According to the invention, solvents such as the isooctane or the methyl cyclohexane are particularly suitable. These solvents make it possible to achieve a very thorough separation between the α-acids and the other substances of the hops or of the extract of hops worked, so that the subsequent isomerization reaction of the α-acids into iso-α acids may take place under very favorable conditions. Indeed, the presence of a high proportion of substances other than the α-acids in the reactive medium inhibits the isomerization reaction.

In a second stage of the method according to the invention to the solution comprised of the said solvent and the hops or extract of hops is added an alkaline solution which is for preference an aqueous solution of sodium carbonate, and the mixture thus obtained is heated to a temperature close to the boiling temperature, so as to transform the α-acids into iso-α acids.

This mixture, comprising an organic phase and an aqueous phase, is acidified in a third stage, so that the said iso-α acids pass into the organic phase.

Subsequently, in a fourth stage, the aqueous phase is separated from the organic phase and the latter is subjected to evaporation in vacuo in order to eliminate the solvent, until a syrupy paste containing the iso-α acids is obtained.

The said aqueous phase may eventually be subjected to a new extraction by the addition of a new volume of solvent followed by a separation of the new aqueous and organic phases and by an evaporation of the solvent from the organic phase. This additional extraction operation may be repeated with the obtained aqueous phases until the quantity of iso-α acids contained in the aqueous phase becomes negligible.

In a second form of embodiment according to the invention the method of extraction includes, in a first stage, carrying out, same as in the method according to the first form of embodiment, an extraction from hops or from non isomerized extracts of hops by means of isooctane or methyl cyclohexane and, in a second stage, isomerizing the α-acids in iso-α acids by the addition of an aqueous solution of sodium carbonate, so as to obtain a pH 10 and subsequently heating the mixture thus obtained.

The method according to this second form of embodiment differs from the method according to the first form of embodiment by the fact, that in the method according to the second form of embodiment, the organic and aqueous phases obtained in the said second stage are separated without first carrying out an acidification of these two phases.

The said 10 pH aqueous phase containing the iso-α acids is brought to pH 7. Subsequently a quantity of saturated hydrocarbon, comprised for preference of isooctane or methyl cyclohexane is added thereto, in order to eliminate other than the iso-α acids substances i.e. the β-acids as well as the fatty acids formed in the course of isomerization. Following a separation of the two new organic and aqueous phases, this new aqueous phase, purified as above, is brought to a pH close to 3, by means of a strong acid, in order to release the iso-α acid from the salt thereof. Subsequently the free iso-α acids are extracted from this aqueous phase by a solvent not miscible with water and dissolving the iso-α acid, this solvent being for preference a chlorinated hydrocarbon, such as methylene chloride. Following evaporation of the solvent, a syrupy mass of high purity and rich in free iso-α acids is obtained.

The free iso-α acids contained in the isomerized extract obtained in this manner are able to impart the bitter taste to the beer, but are still little soluble in water. In order to overcome this disadvantage, the final stage of the method according to the invention includes transforming these free iso-α acids into a salt more soluble in water than these iso-α acids. Advantageously, the isomerized extract of hops containing the free iso-α acids is processed with an aqueous solution of potassium or sodium carbonate in order to produce the potassium or sodium salt of the iso-α acids, salts which are perfectly soluble in water and in beer.

The said saturated hydrocarbon used in the said intermediate stage being for preference comprised of isooctane or of methyl cyclohexane, the organic phase achieved by extraction by means of this hydrocarbon is added to the organic phase following isomerization. The solvent contained in this organic phase may be used again, while the remaining organic residue may be advantageously used in the course of boiling the wort as a copper additive, so as to profit as well from the other compounds of the hops separated in the course of the said process. It is also possible to carry out repeated extractions at the different stages of the method of isomerization so as to obtain a final product of very high purity.

The method according to the invention may be illustrated by the following examples

EXAMPLE I

To a volume of methyl cyclohexane solution containing 50 g of α-acids per liter are added four volumes of water containing 0.3 gram-equivalents of sodium carbonate per liter. The mixture is brought to a boil under good stirring and the reflux is held for 90 minutes. After cooling the aqueous phase is acidified with sulfuric acid.

The mixture separates into two layers; the organic layer is removed after which a volume of methyl cyclohexane is added to the aqueous phase. Thus a second extraction of the aqueous phase is carried out.

The two organic fractions are evaporated in vacuo and the isomerized extract of hops is obtained which has the form of a greenish syrupy paste.

EXAMPLE II

The extract obtained by the action of the methyl cyclohexane on the crushed flowers of hops is kept in solution in this solvent so as to obtain a concentration of 50 grams of α-acids per liter. To one volume of this solution are added four volumes of water containing 0.3 gram-equivalents of sodium carbonate per liter. The mixture is brought to a temperature of 87° C under good stirring and these conditions are maintained for 90 minutes. The aqueous phase separated from the organic phase is brought to ph 7 by means of diluted sulfuric acid and then extracted with one-half volume of methyl cyclohexane. The aqueous phase, separated from this organic phase, is then acidified up to pH 3 by means of sulfuric acid and then extracted three times with one-half volume of methylene chloride. The solvent is completely evaporated, which yields a yellowish syrupy paste containing the iso-α acids.

The extract thus obtained is then processed with an aqueous solution of potassium carbonate so as to form the potassium salt of the iso-α acids which has the form of a light brown syrupy mass, which is well able to dissolve in water and in beer.

It is well understood the the invention is not limited to the forms of embodiment described and that many modifications may be contemplated without departing from the scope of the present patent application.

I claim:
1. A method of preparing iso-α-acids from extracts of hops comprising
   1. preparing an extract of hops containing α-acids of the hops in an organic solvent selected from the group consisting of iso-octane and methylcyclohexane,
   2. mixing said solvent extract with an aqueous alkaline solution forming a mixture comprising an aqueous phase and an organic phase,
   3. isomerizing the α-acids of the hops into iso-α-acids in said mixture and thereby in the presence of said solvent, and
   4. recovering the iso-α-acids. mixture of

2. The method as claimed in claim 1, wherein the isomerizing is by heating, and wherein the recovering of the iso-α-acids comprises the steps of acidifying the mixture of the aqueous phase and the organic phase, separating the organic phase from the aqueous phase, and evaporating the organic phase to a syrupy paste.

3. The method as claimed in claim 2, wherein the recovering of the iso-α-acids subsequent to the separating of the organic phase from the aqueous phase includes additionally repeatedly extracting any remaining iso-α-acids from the aqueous phase by adding an additional quantity of an organic solvent to the aqueous phase, separating the aqueous and organic phases, and combining said organic phases.

4. The method as claimed in claim 2, wherein said extract contains about 50 g of α-acids per liter of said organic solvent.

5. The method as claimed in claim 4, wherein said aqueous alkaline solution is added at a volume ratio to the extract of 4:1 and wherein said aqueous alkaline solution comprises 0.3 gram-equivalents of sodium carbonate per liter of solution.

6. The method as claimed in claim 2, wherein the heating of the mixture is by refluxing the mixture with good stirring for 60 minutes or longer.

7. The method as claimed in claim 1, wherein the isomerizing is by heating and wherein the recovering comprises separating the aqueous phase from the organic phase, and extracting the iso-α-acids from the aqueous phase.

8. The method as claimed in claim 1, wherein the isomerizing is by heating and wherein the recovering comprises separating the aqueous phase from the organic phase, bringing the aqueous phase containing the iso-α-acids to a pH of 7, adding a saturated hydrocarbon to the aqueous phase forming an aqueous phase and an organic phase, separating the aqueous and organic phases, bringing the aqueous phase to a pH of 3, extracting the iso-α-acids from the aqueous phase with an organic solvent not miscible with water to dissolve the iso-α-acids, separating the organic solvent containing the iso-α-acids and collecting the iso-α-acids by evaporation of the solvent.

9. The method as claimed in claim 1, wherein said method subsequent to recovering the iso-α-acids additionally comprises converting the iso-α-acids into the salts thereof, in which said salts formed are more soluble in water than the free iso-α-acids.

10. The method as claimed in claim 9, wherein said salts are selected from the group consisting of the sodium salts and the potassium salts.

11. The method as claimed in claim 8, wherein the saturated hydrocarbon in the recovering is selected from the group consisting of iso-octance and methyl cyclohexane.

12. The method as claimed in claim 8, wherein the organic solvent not miscible with water is a chlorinated hydrocarbon.

* * * * *